GEORGE P. FARMER.

Needle Threader and Spool Combined.

No. 122,241.            Patented Dec. 26, 1871.

Witnesses,
John Parker
Thos. C. McIlvain

George P. Farmer
by his Attys
Howson and Son

UNITED STATES PATENT OFFICE.

GEORGE P. FARMER, OF BROOKLYN, NEW YORK.

IMPROVEMENT IN NEEDLE-THREADER AND SPOOL COMBINED.

Specification forming part of Letters Patent No. 122,241, dated December 26, 1871.

Specification describing a Combined Needle-Threader and Spool, invented by GEORGE P. FARMER, of Brooklyn, in the county of Kings and State of New York.

*Combined Needle-threader and Spool.*

My invention consists of an improvement, fully described hereafter, in the combined needle-threader and spool for which Letters Patent were granted to me on the 30th day of August, A. D. 1870.

Figure 1:
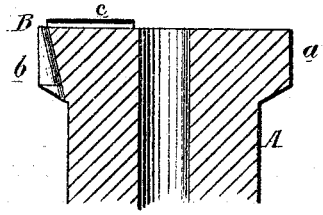
Figure 2:
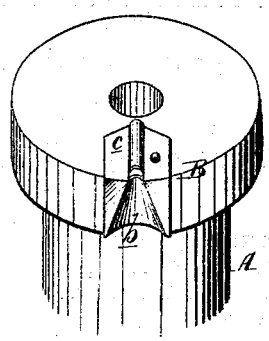
Figure 3:
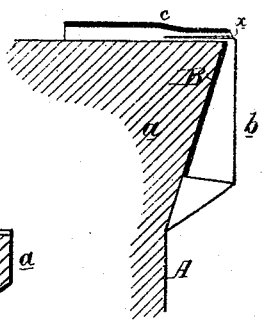
Figure 4:
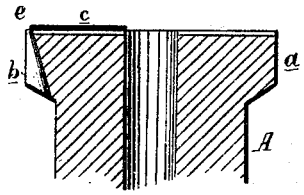
Figure 5:
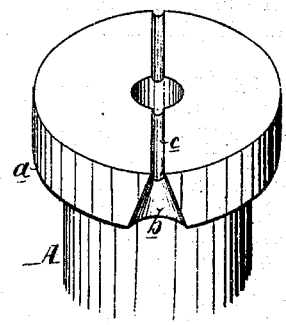
Figure 6:
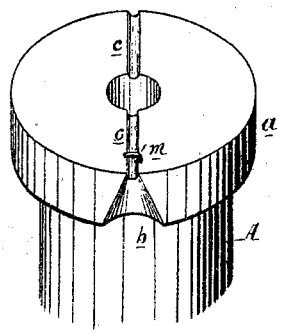
Figure 7:
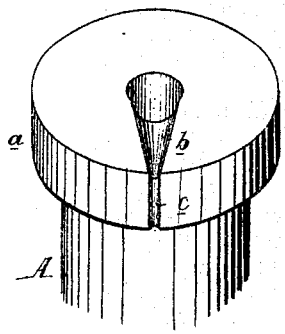

In the accompanying drawing, Figure 1 is a sectional view of part of a spool with my needle-threader attached; Fig. 2, a perspective view of the same; Fig. 3, an enlarged view; Fig. 4, a sectional view of a modification of my invention; and Figs. 5, 6, and 7, perspective views representing further modifications.

In Figs. 1 and 2, A represents a portion of a spool for containing thread, *a* being one of the flanges of the spool. To the edge and top of this flange is secured the needle-threader, consisting of a bent plate, B, in the vertical portion of which is formed a tapering or conical groove, *b*, for the guidance of the thread, and the top portion of the said plate is bent so as to form a guide, *c*, for the insertion of the perforated end of the needle. The guide *c* is flattened at the end adjoining the groove *b*, as best observed in Fig. 3, so that when the needle is inserted into the same it shall have a tendency, in consequence of the flattening of the said needle, to turn the latter, so that the eye, when brought opposite the groove *b*, may be in a proper position for receiving the thread. The flattened needle-guide may also be split in the manner indicated by the line *x*, Fig. 3, so that, if necessary, the said guide may yield slightly, in order to permit the unobstructed passage through the same of the needle. The needle is passed into the guide *c* until its eye comes on a line with the throat or narrowest portion of the groove *b*, so that when the thread is directed up the latter it must pass through the eye of the needle. The needle may be then drawn back or pushed forward through the guide *c*, which will complete the operation of threading. The guide *c* should be adapted for receiving a needle of appropriate size for the thread of the spool to which the guide is attached.

In my aforesaid patented invention a projection opposite the needle-guide was shown which served as a stop for the needle, in order to bring the eye of the latter on a line with the thread-guide. In consequence of this stop the needle could not be drawn entirely through its guide, but had to be withdrawn from the same end into which it was inserted. As a result of this arrangement the threader could not be used in re-threading a needle with thread attached to a piece of work when the said thread had become broken or had slipped from the needle, for the thread had to be drawn through the needle-guide with the needle after the operation of threading, to permit which it would necessarily have to be detached from the work.

I have found in practice that by dispensing with the stop and constructing the device as above described, so as to enable the needle to be drawn entirely through the guide, the operation of threading can be quite as effectually performed in rethreading a needle with thread attached to a piece of work, as with a loose thread. To enable this to be accomplished is the main object of my present invention, and the great advantage which it possesses over the devices shown in my aforesaid patent.

There are several modifications of my invention, one of which is illustrated in Fig. 4, where the tapering groove *b*, which serves as a guide for the thread, is formed in the edge of the flange *a* of the spool, no plate being used for this portion of the device; and the guide *c* for receiving the needle consists of a groove extending across the top of the flange covered by a flat plate, *e*. The plate *e* may, if desired, be dispensed with, and the groove *b* for guiding the thread, and the needle-guide *c*, may both be formed in and constitute a part of the spool. (See Fig. 5.) In the latter modification the needle-eye can be adjusted and held by the thumb-nail during the operation of threading. A flattened staple-like projection, *m*, may, in some cases, be arranged above the needle-guide *c* to insure the proper adjustment of the needle, so that its eye may receive the thread. (See Fig. 6.)

As a further modification the needle-threader may consist of a horizontally-arranged tapering groove, *b*, for the thread-guide formed in the top of the spool, and a vertical guide, *c*, for the needle formed in the edge of the flange *a*. (See Fig. 7.) This arrangement is directly the reverse of that shown in Fig. 4.

In all of the above devices the guide *c* terminates at such a point in relation to the thread-guide that when the needle is adjusted to the said guide its eye will correspond with or be opposite to the throat of the thread-guide, or, in other words, will be in a proper position for receiving the thread from the said guide.

I claim as my invention—

A needle-threading device, attached to or forming a part of the spool, and constructed substantially in the manner described, so as to enable a needle to be threaded either with loose thread or with thread attached to a piece of work.

In testimony whereof I have signed my name to this specification in the presence of two subscribing witnesses.

GEORGE P. FARMER.

Witnesses:
WM. A. STEEL,
JOHN K. RUPERTUS. (38)